(12) United States Patent
Lambrech et al.

(10) Patent No.: US 8,053,035 B2
(45) Date of Patent: Nov. 8, 2011

(54) ELECTRODE ASSEMBLY AND METHOD OF MAKING SAME

(75) Inventors: Matthew Lambrech, Sherman, CT (US); Pinakin Patel, Danbury, CT (US)

(73) Assignee: FuelCell Energy, Inc., Danbury, CT (US)

( * ) Notice: Subject to any disclaimer, the term of this patent is extended or adjusted under 35 U.S.C. 154(b) by 1047 days.

(21) Appl. No.: 11/925,368

(22) Filed: Oct. 26, 2007

(65) Prior Publication Data
US 2009/0111002 A1    Apr. 30, 2009

(51) Int. Cl.
*B05D 1/12* (2006.01)
*B05D 5/12* (2006.01)

(52) U.S. Cl. .......................... 427/466; 427/469; 427/115

(58) Field of Classification Search .................. 427/115, 427/466, 469
See application file for complete search history.

(56) References Cited

U.S. PATENT DOCUMENTS

| | | | |
|---|---|---|---|
| 6,020,083 A | 2/2000 | Breault et al. | |
| 6,365,290 B1 | 4/2002 | Ghezel-Ayagh et al. | |
| 6,425,993 B1 | 7/2002 | Debe et al. | |
| 6,805,990 B2 | 10/2004 | Gorbell | |
| 6,942,943 B2 | 9/2005 | Huang et al. | |
| 7,090,738 B2 | 8/2006 | Kanaoka et al. | |
| 7,131,190 B2 | 11/2006 | Brown et al. | |
| 2005/0079349 A1* | 4/2005 | Hampden-Smith et al. | 428/402 |
| 2006/0121342 A1* | 6/2006 | Sano et al. | 429/162 |
| 2007/0003817 A1 | 1/2007 | Umeda et al. | |
| 2007/0214636 A1 | 9/2007 | Park et al. | |
| 2009/0239116 A1* | 9/2009 | Okumura et al. | 429/30 |

FOREIGN PATENT DOCUMENTS

KR    1020050095975    10/2005

OTHER PUBLICATIONS

H. Nomura, et al.,"Fabrication of YSZ electrolyte using electrostatic spray deposition (ESD):I—a comprehensive study", Journal of Applied Electrochemistry, vol. 35, p. 61-67.

H. Nomura, et al.,"Fabrication of YSZ electrolyte for intermediate temperature solid oxide fuel cell using electrostatic spray deposition: II—Cell performance", Journal of Applied Electrochemistry, vol. 35, pp. 1121-1126 (2005).

Nick van Nispen, "Synthesis of Engineered Particulates Using Dry Particle Coating," available at < education.gsfc.nasa.gov/nycri/research/files/05-NJIT1a.ppt> (2005).

Ann Meeker-O'Connell, "How Photocopiers Work," available at <http://home.howstuffworks.com/photocopier.htm/printable>, printed on Oct. 27, 2006.

"Photocopying", Wikipedia, the free encyclopedia, available at <http://en.wikipedia.org/wiki/photocopier>, printed on Oct. 27, 2006.

"How Photocopiers Work—A Clear Picture," available at <http://www.howitworks.net/how-photocopiers-work.html>, printed on Oct. 27, 2006.

"3M Membrane Electrode Assembly," Product Bulletin.

"Ballard Power Systems—how the technology works," available at <http://www.ballard.com/be_informed/fuel_cell_technology/how_the_technology_works>, printed Feb. 1, 2007.

"Zeta Potential: A Complete Course in 5 Minutes," Zeta-Meter, Inc.

"Zeta Potential," available at <http://www.iscid.org/encyclopedia/Zeta_Potential>, printed on Jan. 31, 2007.

"The Zeta Potential," Colloidal Dynamics, Electroacoustics Tutorials (1999).

\* cited by examiner

*Primary Examiner* — Frederick Parker

(74) *Attorney, Agent, or Firm* — Cowan, Liebowitz & Latman, P.C.

(57) ABSTRACT

An assembly and associated method of manufacture are provided in which electrostatic deposition is used to directly apply and/or apply without solvents an electrode to one of an ion-conducting member, a member adapted to hold an ion-conducting member and a gas diffusion layer of the assembly.

5 Claims, 4 Drawing Sheets

ELECTRODE ASSEMBLY AND METHOD OF MAKING SAME

BACKGROUND OF THE INVENTION

This invention relates to fuel cells and, in particular, to apparatus and methods of manufacturing the electrode assembly thereof.

A fuel cell is a device which directly converts chemical energy stored in hydrocarbon fuel into electrical energy by means of an electrochemical reaction. Generally, a fuel cell comprises an anode and a cathode separated by a member which serves itself to conduct electrically charged ions or is adapted to hold an electrolyte which conducts electrically charged ions. In order to produce a useful power level, a number of individual fuel cells are stacked in series with an electrically conductive separator plate separating the cells.

Each of the anode and the cathode, together with the ion-conducting member or member adapted to hold an ion-conducting electrolyte, comprise what will be referred to herein as the ion-conducting member electrode assembly (ICMEA). For different types of fuel cells, e.g., the proton exchange membrane (PEM), solid oxide (SOFC), molten carbonate (MCFC), phosphoric acid fuel cells (PAFC), etc., the ICMEAs are different, but all require the sandwich construction (planar, tubular or other) of the three components of the electrodes and member. While the discussion to follow illustrates the invention in terms of an assembly with a membrane ion-conducting member, as is used in PEM fuel cells, the principles of the invention are intended to extend to all types of fuel cells, electrochemical devices, and, in particular, the three-component construction of the ICMEAs of these cells.

In a PEM, the ion-conducting member is a membrane and the ICMEA is typically referred to as a membrane electrode assembly (MEA). Significant cost reduction is required in the current manufacturing costs of fuel cell components. Today's methods and systems for the manufacture of the MEA often require many steps causing them to be inefficient and thus expensive. Contributing to this inefficiency and expense is the current need to use solvents and other organics/dispersing agents when casting an MEA to realize a PEM of a desired energy yield. These solvents must be purchased and used throughout the manufacturing process. Aside from the costs associated with their purchase and use, there is an added expense involved in discarding the solvents due to environmental standards and regulations governing such disposal and human safety. Accordingly, eliminating solvents from the manufacturing process would not only reduce costs, but would also contribute to enhanced protection of the environment.

Another difficulty experienced in current practices for the production of MEAs is the inability to form the MEA as precisely as desired. Expensive reformulation steps are required to incorporate any process and design improvements. As a result, making MEAs of different size to accommodate fuel cells having different energy levels is made more difficult.

There are various methods to making an MEA structure. FIG. 1 shows a process for the manufacture of a MEA 10 according to today's conventional practice(s). An ion-conducting member, represented by the membrane 12, is positioned to receive each of the anode 14 and the cathode 16 comprised of their associated catalyst particles 18, 20. Formation of each electrode 14 and 16 begins by providing a desired substrate 21 (sacrificial or functional) to which a prepared "ink" 22, formed of catalyst particles, an ionomer solution and dispersing agents 24, is applied. The ink 22 is cast onto the substrate 21 according to a predetermined patterning chosen to accommodate the desired energy yield of the fuel cell.

Afterward, solvents 26 are applied to fix the ink 22 upon the substrate 21 according to the casting. The substrate 21 is then dried to form the electrode 14 or 16. Each electrode 14, 16 is then cut according to a predetermined size and later assembled with the membrane 12. Formation of each of the electrodes, i.e., the anode 14 and the cathode 16, takes place separately until the MEA 10 is finally formed by laminating, or, hot pressing each electrode 14, 16 into permanent contact with the membrane 10. In the case where a sacrificial substrate is used, a final removal step is required. This process also has a material loss in every step leading to a lower overall yield (<80%).

As may be seen, various stages of the illustrated process require that oversight, represented as quality control "QC", exist in ensuring the quality of the process, and product produced thereby. As can be appreciated, it would be desirable to provide a more efficient method of associating the electrodes 14, 16 with the membrane 10, while at the same time reducing the amount of necessary oversight. Thus, a system and method for manufacturing a MEA which eliminates at least some of the steps represented at "X" would be desirable. Doing so would also provide a method and system better suited for the mass production of low-cost fuel cells.

SUMMARY OF THE INVENTION

In accordance with the embodiment(s) of the invention disclosed hereinafter, an apparatus and associated method are provided in a system for accurately assembling the ICMEA of a fuel cell. An apparatus and associated method are also provided in a system which accomplishes such assembly and better enables the mass production of the ICMEA.

A particular system in use of the apparatus and method comprises an ion-conducting member or a member adapted to hold an ion-conducting electrolyte, and a plurality of electrodes associated with the member through electrostatic deposition thereon wherein such deposition is free of the use of solvents and/or by direct application. Electrostatic deposition (ESD) is a process by which an electrical charge is applied to a particle positioned between a source of the particle and a target surface on which deposition is desired.

In a one aspect of the invention, the process of electrostatic deposition comprises simply spraying a system of surfactant-coated catalyst particles onto the member. In a still further aspect of the invention, such deposition comprises the use of a process akin to xerography, wherein toner material(s) used therewith are replaced by a mixture of surfactant-coated catalyst particles. In particular, the catalyst particles can be coated with ionomer materials and/or a small amount of surface active agent(s) to obtain the desired properties needed for high speed deposition of desired morphology.

In the embodiments disclosed, the particular catalyst particles comprise, optionally, a system of platinum, carbon and other functional additives (organic or inorganic, for example). Whether a particular surfactant/catalyst system is used over another depends upon the particular type of fuel cell for which the ICMEA is being constructed. For example, in the case of a PEM, the surfactant comprises an ionomer. As a further example, in the case of a SOFC, the surfactant may comprise a carbon or a sulfur-free dispensing agent.

In any case, the decision as to which surfactant is chosen to coat the catalyst particles rests on an ability to achieve a desirable zeta potential allowing for optimum transfer and bonding of the electrode to the membrane. Zeta potential is a measure of the applied voltage to particles allowing those particles to move toward an oppositely charged target surface, and is a way of measuring the charge carrying capacity of those particles. It depends on such factors as the type of material and size thereof comprising the particle, and the thickness and type of the surface toward which the particles are intended to move. Further, important to an ability to achieve the desired zeta potential is the thickness of the surfactant coating that is applied to a given catalyst particle. Whether the correct amount is achieved impacts the porosity, pore size distribution and uniformity of the deposition of the electrode upon the member. In this case, the resultant structure will be formed as a three layer MEA.

In another illustrative embodiment, it is contemplated that the surfactant-coated catalyst particles be electrostatically deposited, whether through spraying or xerography-like application, on the gas diffusion layer (GDL) with both the anode and cathode compartments of a particular fuel cell. In this case, the resultant structure will be a five layer structure which includes GDL/Anode/Membrane/Cathode/GDL. Overall in the electrostatic deposition (ESD) process there is no significant material loss, and, hence, the overall yields are very high (>95%).

In all of the embodiments discussed, it is contemplated that the use of ionomer will be decreased relative to current ICMEA production methods. Further, it is contemplated that a finer and more uniform distribution of the ionomer will be realized, thereby leading to a greater electrochemically active construction of the ICMEA.

Still further, it is contemplated that ICMEA production using ESD will enable greater management of gaseous flow throughout the fuel cell given an ability to construct the ICMEA according to a desired porosity (constant or variable) there throughout.

It is to be understood that the above embodiments may be implemented for use with fuel cells and electrochemical devices such as: Blue Energy (BE), Electro-Galvanic (EGFC), Reversible (RFC), Biological (MFC), Zinc (ZFC), Direct Borohydride (DBFC), Alkaline (AFC), Direct Methanol (DMFC), Direct Ethanol (DEFC), Formic Acid (FAFC), Proton Exchange Membrane (PEMFC), Redox (RFC), Phosphoric Acid (PAFC), Molten Carbonate (MCFC), Protonic Ceramic (PCFC) and Solid-Oxide (SOFC).

The ability of the ESD process to use varying particle size and change particle size as desired provides an opportunity to engineer electrodes as desired. This leads to the following advantages of the ESD process in connection with the disclosed MEA manufacture: (1) increased triple phase boundary area in the electrode: reduce Pt content and higher power density, (2) improved water management: prevention of flooding and drying conditions, and (3) incorporation of functional additives: greater subfreezing capability.

With each of the embodiments discussed, it is contemplated that manufacturing costs associated with producing the ICMEA will be reduced in view of the following: a reduced number of manufacturing steps, reduced/eliminated organics, and savings of the amount of catalyst particles used given an ability for more precise placement thereof when constructing each of the electrodes. It also leads to better performance and operating range for the fuel cell.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
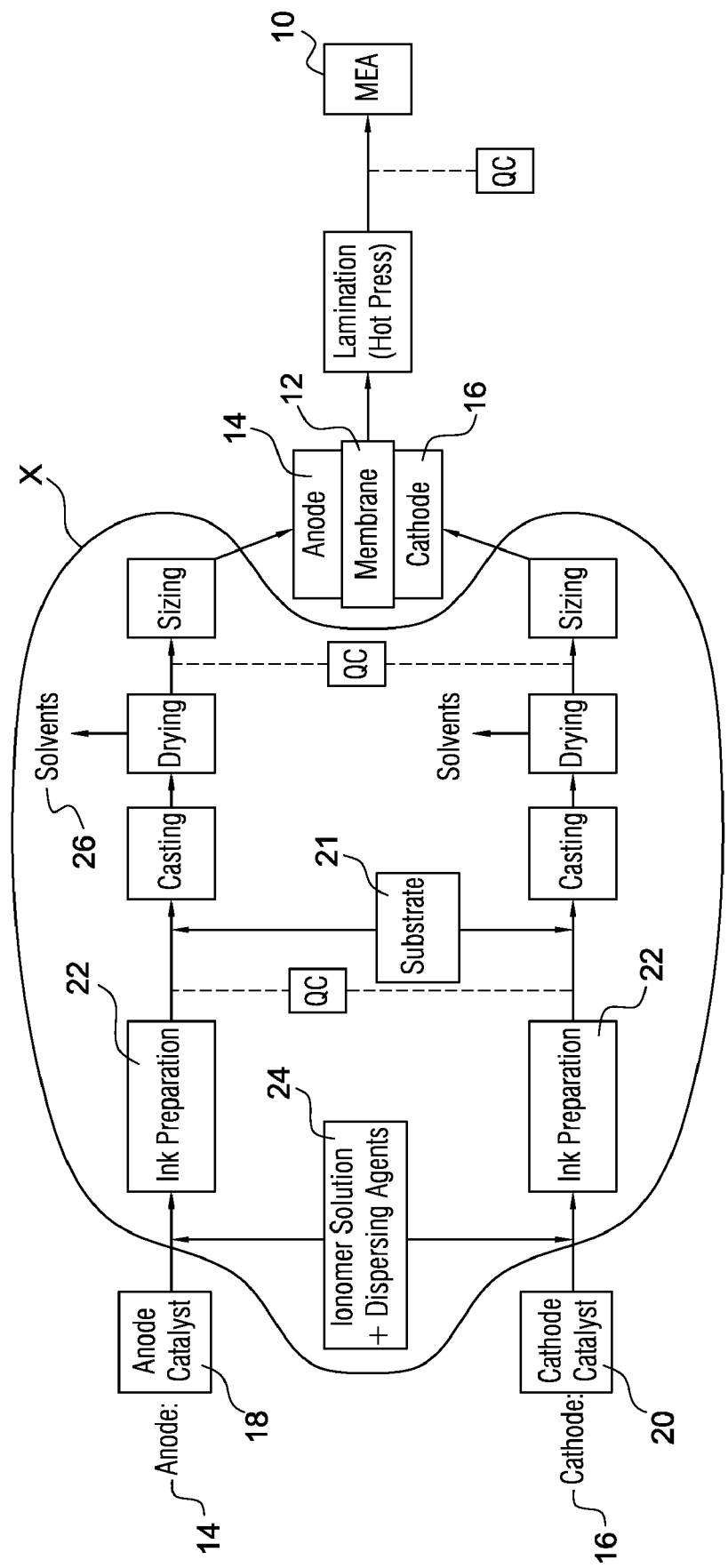
FIG. 1 shows a functional block diagram illustrating an exemplary process of manufacturing a MEA type ICMEA according to conventional processes therefor.

The disclosed methods, apparatus and systems, as well as particular features and advantages of various embodiments thereof will become more apparent from the following detailed description considered with reference to the accompanying drawings in which the same elements depicted in different drawing figures are assigned the same reference numerals.

Figure 2:
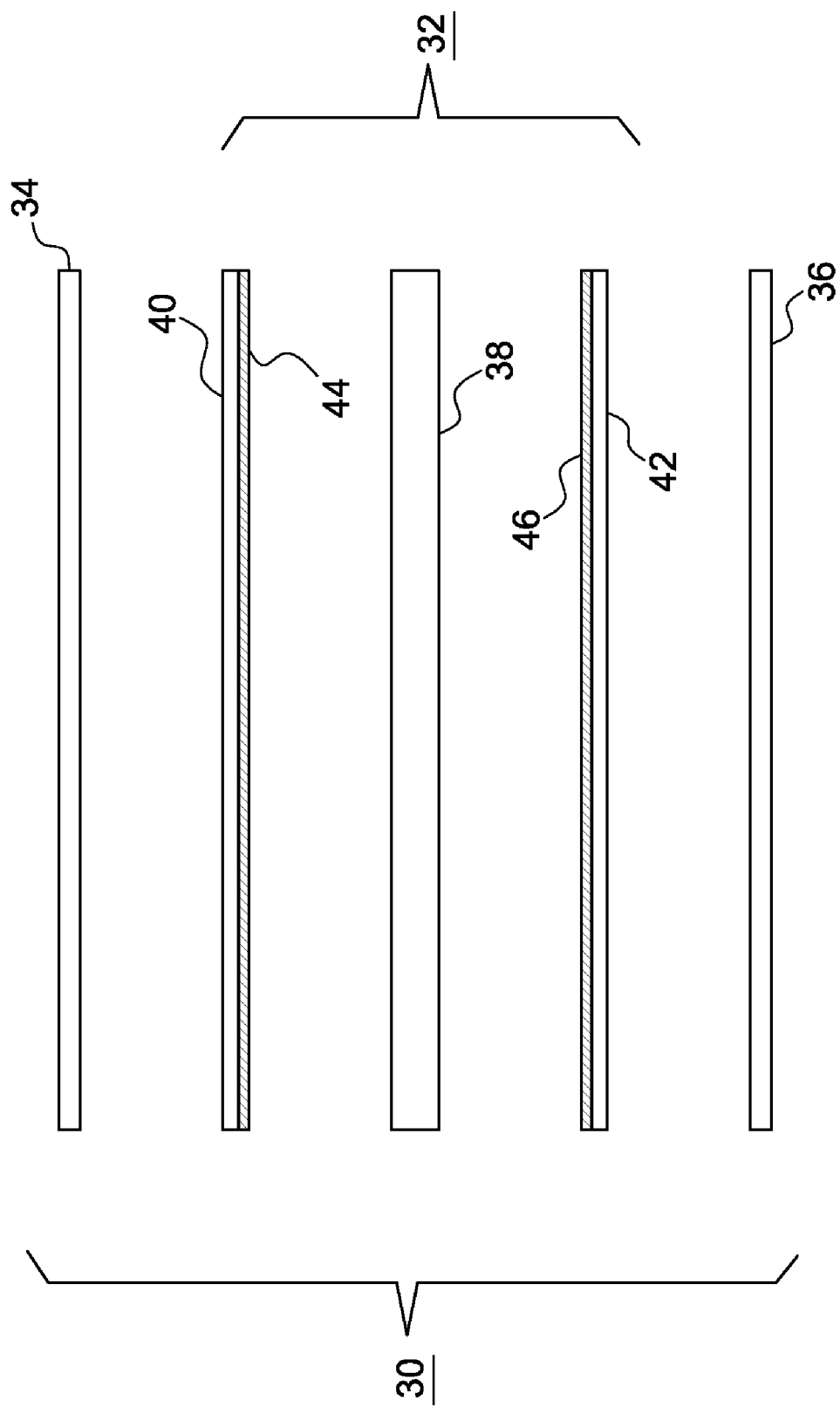
FIG. 2 shows an exploded view of the assembly of an ICMEA in the form of an MEA for a PEM.

Referring to FIG. 2, there is shown a PEM fuel cell 30 comprising a MEA 32 and gas diffusion layers (GDL) 34, 36. The component portions of MEA 32 are separated from one another for ease in understanding their overall assembly, and further, how that assembly is constructed in view of the apparatus, methods and systems described hereinbelow. MEA 32 comprises an ion-conducting member 38 to which an anode 40 and cathode 42 are affixed. Between each of the anode 40 and the cathode 42 and the member 38, a thin layer of catalyst 44, 46 is provided for facilitating the electrochemical reaction occurring during operation of the fuel cell 30, and which is responsible for the production of electricity thereby. The GDLs 34, 36 comprise, optionally, porous carbon paper, and are positioned on either side of the anode 40 and cathode 42 for facilitating dispersion of gaseous flows occurring throughout operation of the fuel cell 30.

Figure 3:
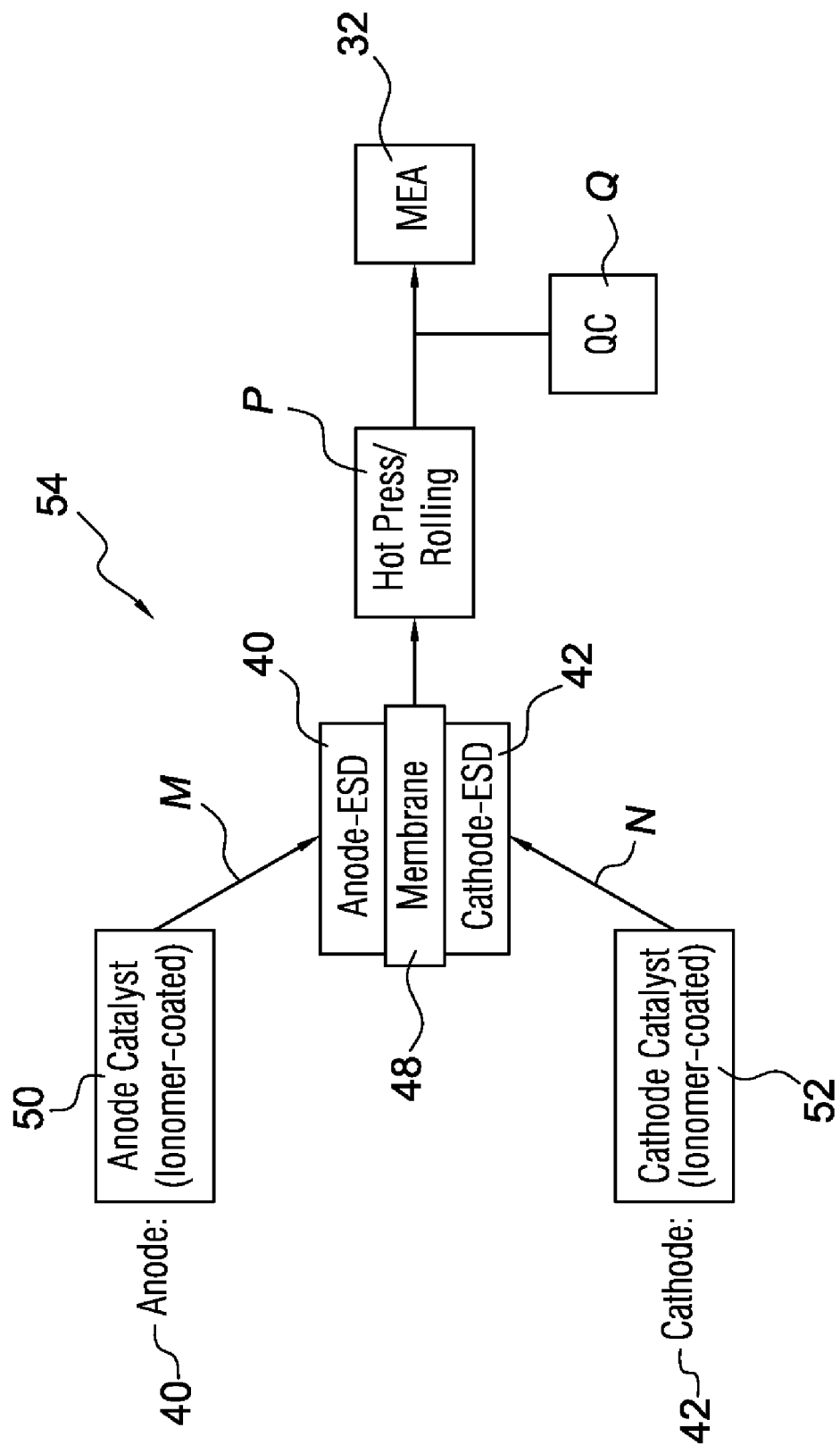
FIG. 3 shows a functional block diagram illustrating a method of manufacturing a MEA of FIG. 2 comprising electrostatic deposition according to a spraying technique.

Referring to FIG. 3, there is shown a method for directly applying each of the anode 40 and cathode 42 to the ion-conducting member 38, represented here by the membrane 48. Taken separately, the anode 40 comprises ionomer-coated anode catalyst particles 50. The particles 50 are electrostatically deposited onto the membrane 48 via spraying, as at "M", by an electrostatic spray gun (not shown). Thereafter, or optionally, simultaneously, the cathode 42 is also formed with ionomer-coated cathode catalyst particles which are similarly deposited onto the membrane 48 in like manner as at "N". Once each of the anode 40 and cathode 42 are deposited onto the membrane 48, the assembly 54 of the anode 40, membrane 48 and cathode 42 are laminated, as by hot pressing or rolling, as at "P". This compacts the components together, to form the MEA 32. As will be understood, oversight QC, as at "Q", subsequent to the hot pressing the assembly 54 is, optionally, provided to ensure the desired configuration of the MEA 32.

As will be understood by one of ordinary skill in the art, spraying of each of the anode 40 and the cathode 42 onto the membrane 48 may be achieved by known means using the electrostatic charge principles applicable to the spraying of paint onto an auto body. As will be further understood, implementation of this principle allows for ionomer suitable surface active agents to be first coated onto the catalyst particles. The resulting ionomer-coated catalyst particles 50 are then sprayed from the spray gun toward the surface of the membrane 48. As the ionomer-coated catalyst particles 50 travel, an electric charge is simultaneously applied thereto. The difference in polarity of the now charged ionomer-coated catalyst particles 50 and the membrane 48 causes the particles 50 to then be attracted to and deposited onto the membrane 48. No material is wasted in the deposition process as there is no over spray on other surfaces.

In the case of the MEA 32, it will be understood by one of ordinary skill in the art that the ionomer occupies dual roles of enabling the carrying of the charge during ESD, and later as the proton conductor in actual fuel cell operation. It is to be understood that the selection of the conductive and non-conductive materials used in the system of ionomer and catalyst will permit manipulation of the patterning and shape of the anode 40 and cathode 42 deposited onto the membrane 48. It will be further understood that the ionomer may be included in a surfactant and that the ionmer may comprise, optionally, nafion, hyfion or other hydrocarbon materials. The selection of a particular surfactant/catalyst mixture is determinative of the zeta potential to be achieved in accomplishing bonding with the membrane 48.

Figure 4A:
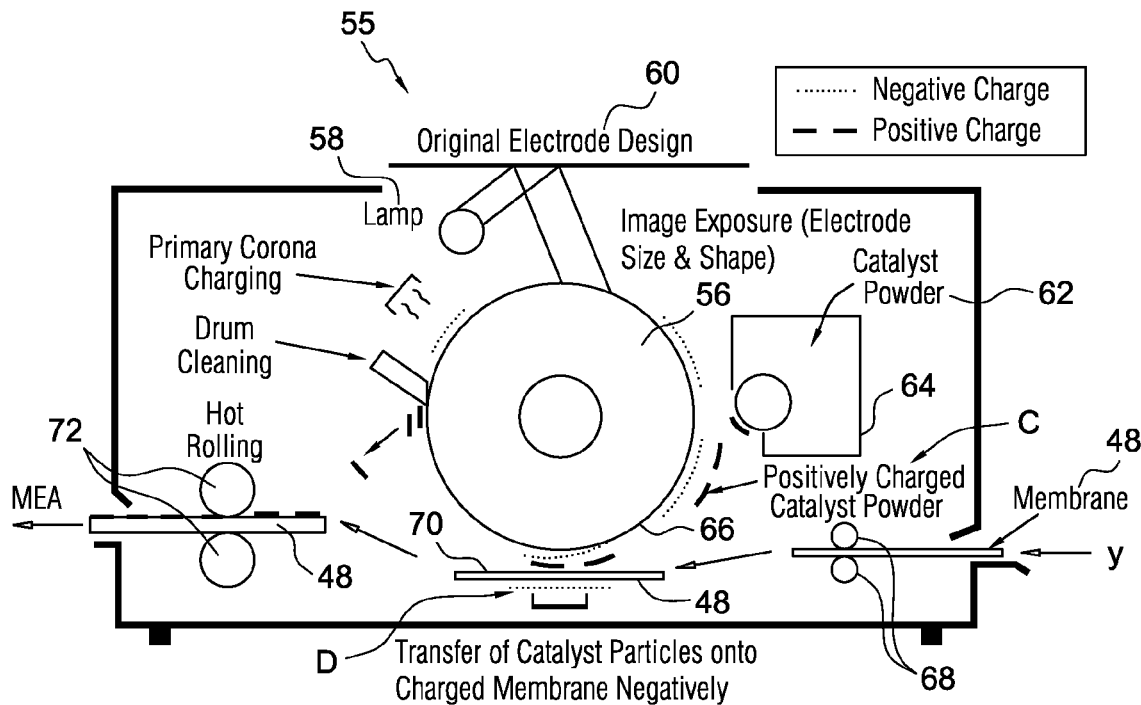
FIG. 4A shows an apparatus for implementing the method of FIG. 4B.
Figure 4B:
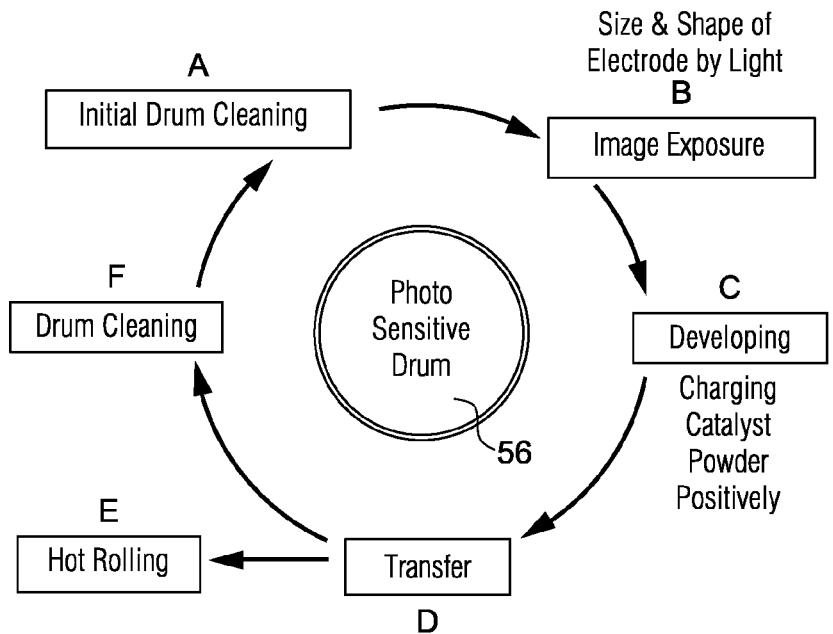
FIG. 4B shows a diagram for explaining a method of manufacturing the MEA of FIG. 2 comprising electrostatic deposition according to a technique akin to xerography, and as shown by FIG. 4A.

Referring to FIGS. 4A and 4B, there is shown a method of electrostatically depositing each of the anode 40 and the cathode 42 onto the membrane 48 by a system akin to that of xerography, i.e., electrophotography or photocopying, which is described in detail in U.S. Pat. No. 2,297,691, which is hereby incorporated herein by reference in its entirety. In the FIGS. 4A and 4B, an imaging device 55 is shown for carrying out the ESD process. The device 55 comprises a metal cylinder having a photosensitive drum 56 mounted for rotation about a horizontal axis. The drum 56 is coated with a composition (not shown), optionally comprising selenium, and emanates an electrostatic (negative) charge, as at "A", upon being hit with light from a corona lamp 58.

The image of a predetermined electrode design 60 is then beamed onto the drum 56, as at "B". The electrode design is held on to the drum by light-sensitive materials coated thereon. As the drum 56 rotates, the negative charge is released in areas where there is no electrode design 60, i.e., for example, where there is no image as in the case of an image being projected onto a white piece of paper being photocopied. The charge retained by the drum 56 replicates an image of the electrode design 60. This approach can provide areas of solid particles and areas of no solid particles defining the pores for gas flow.

Thereafter, as the drum 56 continues to rotate with the image of the electrode design 60, oppositely charged surfactant/catalyst particles or mixture 62, held in a retaining device 64 (similar to a toner cartridge in a copier machine), becomes attracted to the imaged design 60 and so that a coating of the particles or mixture 62 conforming to the design becomes attached to the drum, as at "C". At this point, the membrane 48 is passed through the imaging device 55 at "y", and is guided toward an underside 66 of the drum 56 by a pair of rollers 68. As the membrane 48 passes by the drum 56, the positively charged surfactant/catalyst particles or mixture 62 having the imaged design 60 of the electrode 40 or 42 is transferred to the oppositely (negatively) charged surface 70 of the membrane 48, as at "D". The membrane 48 is then moved toward a further pair of rollers 72 that seal the image of the electrode design 60 to the membrane 48, as at "E".

Accordingly, depending upon the surfactant/catalyst particles or mixture and the electrode design 60, either the anode 40 or cathode 42, will have been formed on the membrane 48. Repeating this process with the surfactant/catalyst particles or mixture and design for the other electrode and with application to the opposite surface of the membrane 48 will complete the MEA. In is understood that this may be accomplished in a procedure akin to double-sided photocopying.

A multi-gas approach can be used to make a multi-layer electrode structure with each layer having a desirable functionality. The functionality near the membrane can be tailored for a greater electrochemical activity, and away from the membrane can be tailored for a better passage of the reactant and product streams.

It is to be further understood that deposition of the electrodes 40, 42 in the manner performed by the imaging device 55 allows for greater ability to finely construct an electrode on the surface of the membrane 48. Thus, desired hydrophilic and hydrophobic domains, i.e., the patterning of the particular electrode design, may be realized. Such construction also enables the deposition of assorted catalyst particles having differing functional characteristics, similar to the deposition of multiple colors in a color photocopy.

Also, the aforementioned method enables the construction of a ICMEAs having multiple layer electrodes comprising graded structural surfacing and compositions. This way, an ICMEA can be constructed, for example, such that the outermost electrode layer is designed for higher loading given a particularly designed energy yield for the fuel cell. As such, the outermost layer may, for instance, comprise a greater catalyst/additive content and then subsequent layers lesser catalyst/additive content thereby allowing for their greater porosity.

It will be appreciated that construction of the ICMEA through use of the imaging device 55 allows for rapid changing the particular ICMEA design at any given time. The particular such design may depend on factors including the type of fuel cell being produced, as well as such factors as the operating temperatures with which a given fuel cell is rated. Overall, the flexibility in the ESD process makes it unique for a low-cost, high-yield manufacturing of advanced cell designs.

In another embodiment and with reference to FIG. 2, it is contemplated that the electrodes 40, 42 may be ESD deposited on their respective GDLs 34 and 36, as shown in either FIGS. 3 or 4A-4B, i.e., by either electrostatic spray or via the imaging device 55. Thereafter, and similarly as in the description provided hereinabove, the electrode coated GDL is then hot pressed so as to form each of the electrodes 40, 42 with the membrane 48.

In all of the embodiments discussed herein, it is further contemplated that the process of coating the catalyst particles with a given surfactant may be integrated into the manufacture of either the catalyst particles or surfactant themselves. The surfactant to the catalyst ratio may vary from 0.01 to 1.0%, but may go as high as 50%. The catalyst may include varying particle sizes from nano-meters to micron-sizes of single or multi-component compositions. Functional additives may be organic/inorganic in nature and can be also nano-meter to micron sizes as well.

In all cases it is to be understood that the above-described subject matter is merely illustrative of the many possible specific embodiments, which represent applications of the present invention. Numerous and varied other arrangements can be readily devised in accordance with the principles of the present invention, without departing from the spirit and scope of the invention. Thus, for example, for solid-oxide fuel cells, it is contemplated that the above-mentioned surfactant comprises carbon, nickel, carbon or modified YSZ (Tosoh 8YSZ, or, Yttria-Stabilized Zirconia). Additionally, the process of the invention can be used to add custom-tailored functional layers for MEAs of different types of electrochemical devices.

What is claimed is:

1. A method for fabricating an assembly for use with or as part of one of a fuel cell and electrochemical device, comprising:
   providing a member;
   providing surfactant-coated catalyst particles; and
   depositing by electrostatic deposition the surfactant-coated catalyst particles on the member to form at least one electrode on the member, said electrostatic deposition being free of the use of solvents and by direct application using one or both of a rotating drum and an imaging device.

2. The method in accordance with claim 1, wherein:
   said member is one of an ion-conducting member, a member adapted to hold an ion-conducting electrolyte and a gas diffusion membrane.

3. The method in accordance with claim 1, wherein:
   the imaging device is a photocopying device.

4. The method in accordance with claim 1, further comprising:
   pressing the electrostatically deposited electrode and member together.

5. The method in accordance with claim 1, wherein the surfactant is an ionomer comprising one of nafion and hyfion.

* * * * *